L. F. & R. SCHULZE.
METAL WORKING MACHINE.
APPLICATION FILED OCT. 4, 1912.
1,157,050.
Patented Oct. 19, 1915.
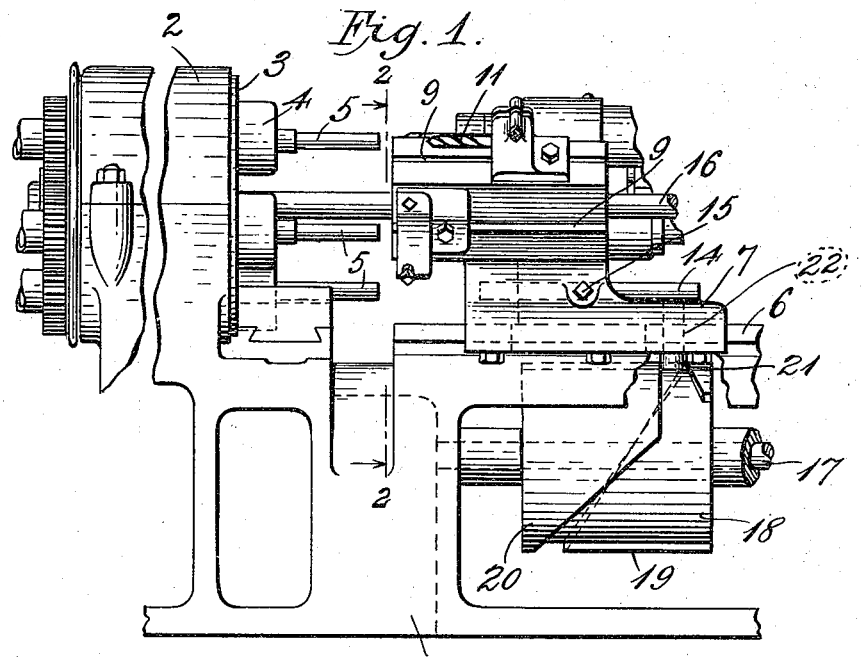
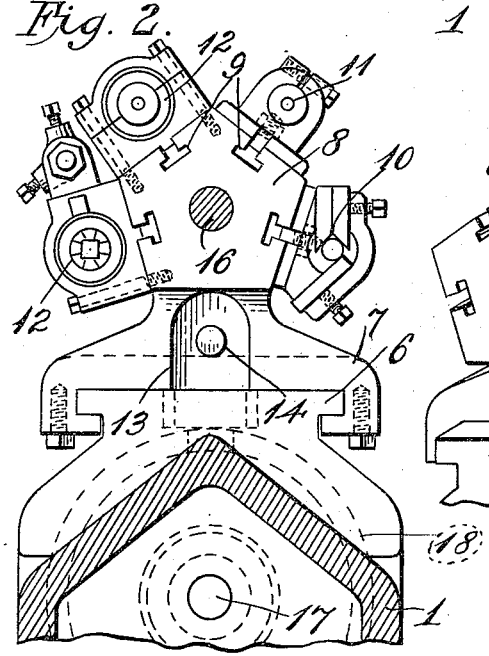
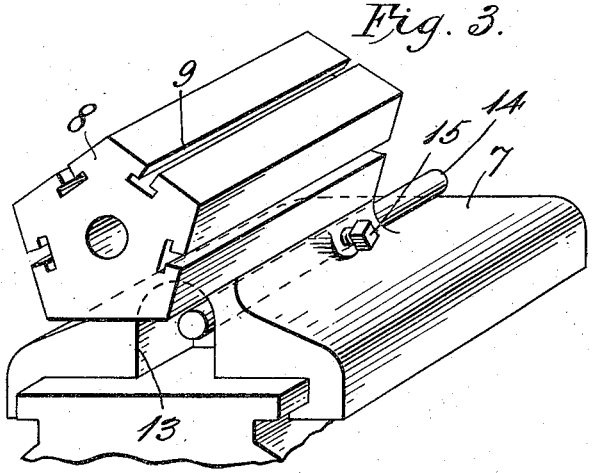
Witnesses:
A. L. Lord.
C. H. Tresch.
Inventors
Leon F. Schulze and
Robert Schulze;
by B. W. Brockett
Atty.

UNITED STATES PATENT OFFICE.

LEON F. SCHULZE AND ROBERT SCHULZE, OF CLEVELAND, OHIO.

METAL-WORKING MACHINE.

1,157,050.  Specification of Letters Patent.  Patented Oct. 19, 1915.

Original application filed December 19, 1908, Serial No. 468,280. Divided and this application filed October 4, 1912. Serial No. 723,939.

*To all whom it may concern:*

Be it known that we, LEON F. SCHULZE and ROBERT SCHULZE, citizens of the United States, residing at Cleveland, in the county of Cuyahoga and State of Ohio, have invented certain new and useful Improvements in Metal-Working Machines, of which the following is a specification.

This invention relates to improvements in metal working machines generally and it particularly refers to the tool support in such machines, and it forms a division of our copending application, Serial No. 468,280, filed December 19, 1908, for metal working machine.

More specifically the invention relates to a metal working machine comprising a head having a plurality of stock spindles and a tool support slidably mounted on the frame having a plurality of faces for receiving metal working tools, one of the faces forming the base for supporting the tool support.

The invention may be further briefly summarized as consisting in the construction and combination of parts hereinafter set forth in the following description, drawings and claims.

Referring to the drawings, Figure 1 is a side elevation of a portion of a metal working machine showing our device applied; Fig. 2 is a front elevation taken upon the line 2—2 of Fig. 1; and Fig. 3 is a perspective view of the tool support itself.

In carrying out the invention any preferred form and construction of parts may be employed so long as they possess the necessary characteristics, but we have shown one form in the drawings which is highly effective in operation, and in such embodiment 1 represents the frame of the machine which is provided with a suitable stock spindle supporting member 2 adapted to receive a spindle head 3 adapted to be rotated intermittently as is common in machines of this type, no mechanism for performing this function being shown since the same is considered to be unnecessary. This head carries a plurality of stock spindles, in which are mounted suitable pieces of stock 5. The frame is also provided with a suitable guideway 6 upon which is mounted the tool support comprising the supporting portion 7 preferably formed integral with a multi-faced tool support member 8. Each one of the faces is provided with a T-shaped slot 9 for receiving the suitable tools which may be of any form, such as for example a cutting off tool 10, a boring tool 11 and suitable threading tools, which are represented at 12. The supporting portion 7 is provided with a recess 13 in its front face. Axially extending through this supporting portion is an opening for receiving a suitable rod 14 which forms a stop for determining the length of stock fed, this rod being held in any adjusted position by a check nut 15.

A suitable driving shaft 16 extends through the tool support and through the spindle head 3 and drives all the parts by any suitable mechanism, not shown. Supported in the main frame in any suitable manner is a cam shaft 17 which carries a cam drum 18 provided with cams 19 and 20 engaging a roller 21 mounted on a pin 22 shown in dotted lines in Fig. 1 and secured in the supporting portion 7 of the tool support. The cams and this cam drum 18 serve to move the tool support backward and forward with respect to the work.

Having described our invention, we claim:—

1. In a metal working machine, in combination, a frame, a spindle head having a plurality of spindles, and a longitudinally movable tool support having a plurality of faces substantially parallel with the axis of the spindle carrier, a number of the faces being arranged within the circle described by the spindles and carrying tools, and another of the faces engaging the frame and forming the support for the tool support.

2. In a metal working machine, in combination, a frame, a spindle head having a plurality of spindles, and a longitudinally movable tool support having a plurality of faces substantially parallel with the axis of the spindle carrier, a number of the faces being arranged within the circle described by the spindles and carrying tools, and another of said faces being outside of the circle described by the spindles and engaging the frame to form a support for the tool support.

3. In a metal working machine, in combination, a frame, a spindle head having a plurality of spindles, a longitudinally movable tool support having a plurality of tool bearing faces substantially parallel with the axis of the spindle carrier and arranged within the circle described by the spindles, and an integral supporting portion extending to the rear of the forward end of the tool support and engaging the frame.

In testimony whereof we affix our signatures in presence of two witnesses as follows.

LEON F. SCHULZE.
ROBERT SCHULZE.

Witnesses:
A. A. BEMIS,
C. H. TRESCH.

Copies of this patent may be obtained for five cents each, by addressing the "Commissioner of Patents, Washington, D. C."